(12) United States Patent
Naruse

(10) Patent No.: US 9,136,720 B2
(45) Date of Patent: Sep. 15, 2015

(54) VEHICLE POWER CONTROL APPARATUS AND VEHICLE POWER CONTROL METHOD

(71) Applicant: Makoto Naruse, Toyota (JP)

(72) Inventor: Makoto Naruse, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 276 days.

(21) Appl. No.: 13/921,605

(22) Filed: Jun. 19, 2013

(65) Prior Publication Data

US 2013/0342163 A1    Dec. 26, 2013

(30) Foreign Application Priority Data

Jun. 21, 2012   (JP) .................................. 2012-139514

(51) Int. Cl.
| | |
|---|---|
| *H02J 7/00* | (2006.01) |
| *B60L 11/18* | (2006.01) |
| *B60L 11/14* | (2006.01) |
| *H02J 7/34* | (2006.01) |

(52) U.S. Cl.
CPC .............. *H02J 7/0036* (2013.01); *B60L 11/14* (2013.01); *B60L 11/1809* (2013.01); *B60L 11/1816* (2013.01); *B60L 11/1868* (2013.01); *H02J 7/34* (2013.01); *B60L 2210/40* (2013.01); *B60L 2240/547* (2013.01); *B60L 2250/10* (2013.01); *B60L 2250/16* (2013.01); *Y02T 10/70* (2013.01); *Y02T 10/7005* (2013.01); *Y02T 10/7066* (2013.01); *Y02T 10/7077* (2013.01); *Y02T 10/7241* (2013.01); *Y02T 90/127* (2013.01); *Y02T 90/14* (2013.01)

(58) Field of Classification Search
CPC ......................................................... Y02T 90/14
USPC ................................................... 320/109, 104
See application file for complete search history.

(56) References Cited

U.S. PATENT DOCUMENTS

| | | | |
|---|---|---|---|
| 8,030,882 B2 * | 10/2011 | Ito et al. ......................... | 320/104 |
| 2010/0025127 A1 * | 2/2010 | Oyobe ......................... | 180/65.22 |
| 2010/0038156 A1 * | 2/2010 | Fujitake et al. ............. | 180/65.22 |
| 2010/0116571 A1 * | 5/2010 | Suzuki ......................... | 180/65.25 |
| 2010/0133024 A1 * | 6/2010 | Miwa et al. ................. | 180/65.21 |
| 2010/0295507 A1 | 11/2010 | Ishii et al. | |
| 2011/0121779 A1 * | 5/2011 | Ichikawa et al. .............. | 320/109 |
| 2012/0001483 A1 * | 1/2012 | Bergefjord ..................... | 307/9.1 |
| 2012/0286575 A1 * | 11/2012 | Park et al. ....................... | 307/31 |

FOREIGN PATENT DOCUMENTS

| | | |
|---|---|---|
| JP | 11-313444 | 11/1999 |
| JP | 2009-027811 A | 2/2009 |
| JP | 2009-171733 A | 7/2009 |

* cited by examiner

*Primary Examiner* — Samuel Berhanu
*Assistant Examiner* — Jerry D Robbins
(74) *Attorney, Agent, or Firm* — Kenyon & Kenyon LLP

(57) ABSTRACT

A control unit of a vehicle power control apparatus performs an operation described below. The control unit fluctuates a voltage of an alternating-current power output from a discharging terminal with a power supplier when the control unit detects that a receiving terminal of an alternating-current load or a charging terminal is connected to the discharging terminal, or that a supply terminal of an alternating-current power supply or the discharging terminal is connected to the charging terminal. Also, the control unit directs a notifying portion to perform a notifying operation when the control unit detects that a voltage of alternating-current power input to the charging terminal is fluctuating in the same manner that a voltage of alternating-current power output from the discharging terminal is fluctuating.

2 Claims, 3 Drawing Sheets

VEHICLE POWER CONTROL APPARATUS AND VEHICLE POWER CONTROL METHOD

INCORPORATION BY REFERENCE

The disclosure of Japanese Patent Application No. 2012-139514 filed on Jun. 21, 2012 including the specification, drawings and abstract is incorporated herein by reference in its entirety.

BACKGROUND OF THE INVENTION

1. Field of the Invention

The invention relates to a vehicle power control apparatus provided with a charging terminal for storing power from an alternating-current power supply outside of a vehicle to a secondary battery, and a discharging terminal for supplying power to an alternating-current load outside of the vehicle, as well as a control method of power for a vehicle.

2. Description of Related Art

In recent years, vehicles provided with a secondary battery (hereinafter referred to as an "onboard secondary battery") that stores electric power (simply referred to as "power" in this specification) to be supplied to an electric motor used as a power source, such as hybrid vehicles that run using a combination of an engine and an electric motor, or electric vehicles that run using an electric motor, are continuing to gain popularity.

Some of these kinds of vehicles are provided with a vehicle power control apparatus that is able to charge the onboard secondary battery from an alternating-current (AC) power supply outside the vehicle, and supply power stored in the onboard secondary battery to an alternating-current load outside the vehicle (Japanese Patent Application Publication No. 2009-27811 (JP 2009-27811 A). The AC power supply is a commercial power supply, for example, and the AC load is a home appliance, for example.

JP 2009-27811 A describes a plug that can be connected to an AC power supply or an AC load outside the vehicle. This plug is a plug that can be used for both charging and discharging. With the vehicle power control apparatus described in JP 2009-27811 A, when an AC power supply outside the vehicle is connected to the plug, AC power from the AC power supply is input from the plug, converted to direct-current (DC) power by a predetermined inverter, and charged to the onboard secondary battery. Also, when an AC load outside the vehicle is connected to the plug, power stored in the onboard secondary battery is converted into AC power by a predetermined inverter, and then supplied to the AC load from the plug.

In JP 2009-27811 A, as described above, a charging terminal that inputs power from an AC power supply outside the vehicle, and a discharging terminal that supplies power to an AC load outside the vehicle are formed with a single plug. The charging terminal and the discharging terminal can also be formed separately. For example, an idea to use an outlet of the same shape as an AC 100 V outlet as the discharging terminal, and use a plug that can be connected to the AC 100 V outlet as the charging terminal has been proposed (hereinafter, this proposal will be referred to as the "proposed example").

In the proposed example described above, if a user mistakenly connects the charging terminal to the discharging terminal, a cycle will be created in which power discharged from the onboard secondary battery is charged to the onboard secondary battery via the discharging terminal and the charging terminal. Power stored in the onboard secondary battery will be consumed due to power loss that occurs with this cycle. Therefore, there is a need to be able to detect this kind of improper connection, and be able to notify the user of the vehicle.

SUMMARY OF THE INVENTION

The invention realizes the following in a vehicle power control apparatus provided with a charging terminal for storing power from an alternating-current power supply outside of a vehicle to a secondary battery, and a discharging terminal for supplying power to an alternating-current load outside of the vehicle, as well as a control method of power for a vehicle. That is, a vehicle user or the like is quickly made aware when the charging terminal is mistakenly connected to the discharging terminal, and the alternating-current load is able to be operated when the alternating-current load is correctly connected to the discharging terminal.

A first aspect of the invention relates to a vehicle power control apparatus that includes a secondary battery, a charging terminal, a charger, a discharging terminal, a power supplier, a notifying portion, and a control unit. The charging terminal is able to be connected to a supply terminal of a predetermined alternating-current power supply. The charger is configured to convert alternating-current power input from the charging terminal to direct-current power and charge the direct-current power to the secondary battery. The discharging terminal is able to be connected to a receiving terminal of a predetermined alternating-current load and the charging terminal. The power supplier is configured to convert the direct-current power from the secondary battery to alternating-current power and output the alternating-current power from the discharging terminal. The notifying portion is configured to perform a notifying operation indicating that the charging terminal is improperly connected to the discharging terminal. The control unit is configured to control the charger, the power supplier, and the notifying portion. The control unit is configured to fluctuate a voltage of the alternating-current power output from the discharging terminal with the power supplier when the control unit detects that the receiving terminal of the alternating-current load or the charging terminal is connected to the discharging terminal, or that the supply terminal of the alternating-current power supply or the discharging terminal is connected to the charging terminal. In addition, the control unit is configured to direct the notifying portion to perform the notifying operation when the control unit detects that a voltage of alternating-current power input to the charging terminal is fluctuating in the same manner that a voltage of the alternating-current power output from the discharging terminal is fluctuating.

A second aspect of the invention relates to a control method of power for a vehicle, the vehicle including a secondary battery, a charging terminal, a charger, a discharging terminal, and a power supplier. The charging terminal is able to be connected to a supply terminal of a predetermined alternating-current power supply. The charger is configured to convert alternating-current power input from the charging terminal to direct-current power and charge the direct-current power to the secondary battery. The discharging terminal is able to be connected to a receiving terminal of a predetermined alternating-current load and the charging terminal. The power supplier is configured to convert the direct-current power from the secondary battery to alternating-current power and output the alternating-current power from the discharging terminal. This control method includes i) detecting that the receiving terminal of the alternating-current load or the charging terminal is connected to the discharging terminal, or that the supply terminal of the alternating-current power supply or the discharging terminal is connected to the charging terminal, ii) fluctuating a voltage of the alternating-current power output from the discharging terminal; iii) detecting that a voltage of alternating-current power input to the charging terminal is fluctuating in the same manner that a voltage of the alternating-current power output from the discharging terminal is fluctuating, and iv) performing a notifying operation indicating that the charging terminal is improperly connected to the discharging terminal.

That is, with this structure, when the voltage of the alternating-current power input to the charging terminal is fluctuating in the same manner that the voltage of the alternating-current power output from the discharging terminal is fluctuating, it is determined that the charging terminal that is not a proper connecting counterpart is mistakenly connected to the discharging terminal. Then a vehicle user or the like, for example, is notified of this improper connection by the control unit directing the notifying portion to perform a notifying operation.

As a result, power is able to quickly stop being consumed due to the improper connection by the vehicle user unplugging (i.e., disconnecting) the charging terminal from the discharging terminal in response to the notification.

When alternating-current power of a constant voltage is input to the charging terminal, it can be determined that the receiving terminal of the alternating-current load that is a proper connecting counterpart is connected to the discharging terminal, so in this case, the control portion does not direct the notifying portion to perform a notifying operation, and the voltage of the alternating-current power output from the discharging terminal can be made constant.

In this way, in the invention, when it is detected that the receiving terminal of the alternating-current load or the charging terminal is connected to the discharging terminal, alternating-current power output from the discharging terminal is supplied to the connecting counterpart of the discharging terminal even though the voltage is fluctuating, during the period from the time of the detection until a determination is made as to whether the charging terminal that is not a proper connecting counterpart is plugged into the discharging terminal. The connecting counterpart is the receiving terminal of the alternating-current load or the charging terminal.

That is, if the receiving terminal of the alternating-current load that is a proper connecting counterpart is plugged into the discharging terminal, alternating-current power output from the discharging terminal would be supplied even though the voltage is fluctuating, from the time at which the connection is detected. Therefore, usability is improved, e.g., the alternating-current load is able to be operated. This is advantageous compared to another mode. The other mode is, for example, a mode of detecting the improper connection by outputting a signal waveform such as a weak pulse, for example, from the discharging terminal, and detecting the improper connection by the detection of this signal waveform.

Also, when detecting the improper connection, the voltage of the alternating-current power output from the discharging terminal is merely fluctuated using an existing power supplier, so it is extremely practical, e.g., the circuit configuration of the power supplier does not need to be drastically changed.

The invention relates to a vehicle power control apparatus provided with a charging terminal for storing power from an alternating-current power supply outside of a vehicle to a secondary battery, and a discharging terminal for supplying power to an alternating-current load outside of the vehicle, as well as to a control method of power for a vehicle. In this kind of vehicle power control apparatus and control method of power for a vehicle, a vehicle user or the like is quickly made aware when the charging terminal is mistakenly connected to the discharging terminal, and the alternating-current load is able to be operated when the alternating-current load is correctly connected to the discharging terminal.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings.

Figure 1:
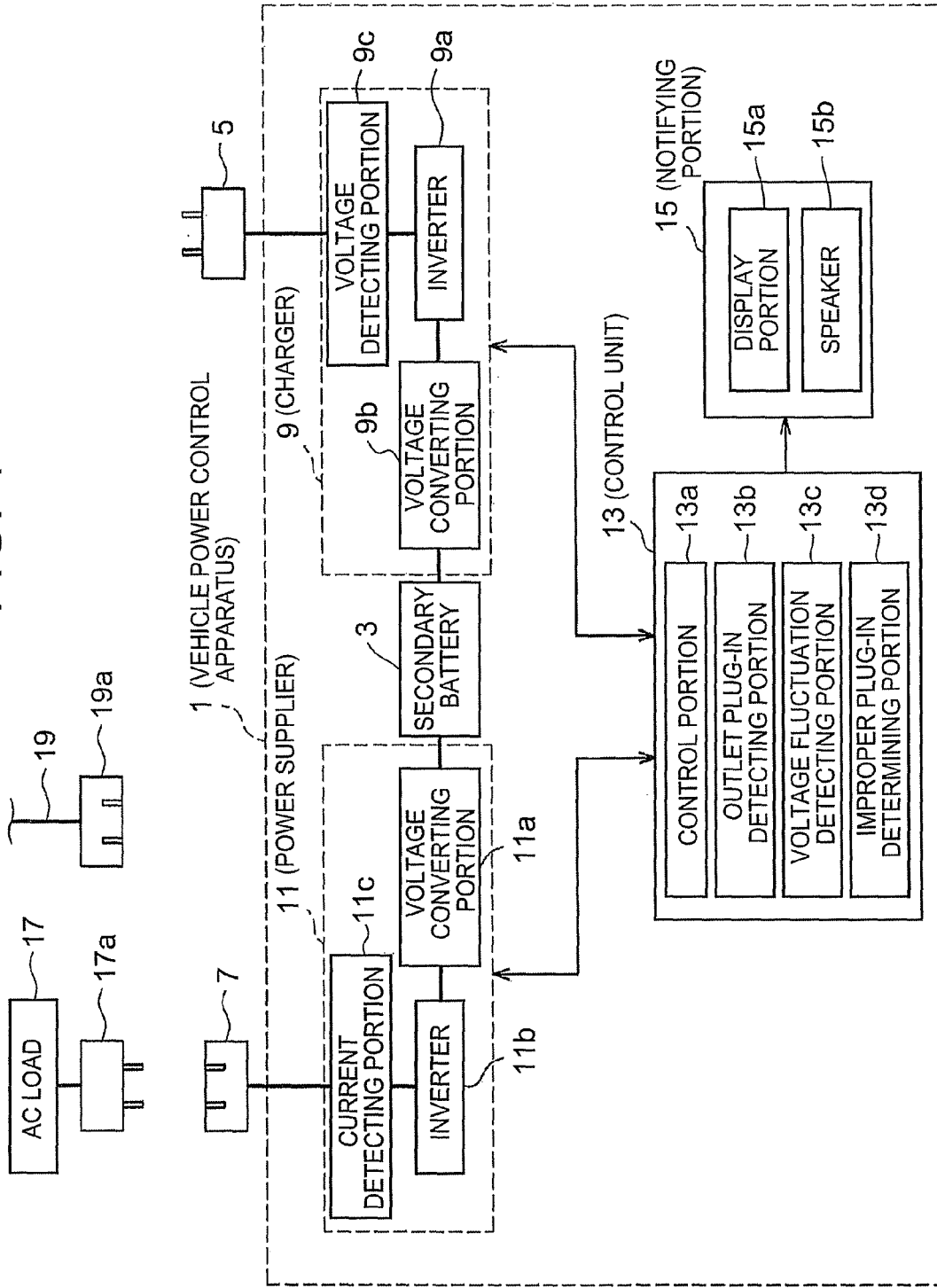
FIG. 1 is a block diagram schematically showing a vehicle power control apparatus according to one example embodiment of the invention.

FIG. 1 is a block diagram schematically showing a vehicle power control apparatus according to one example embodiment of the invention.

A vehicle power control apparatus 1 according to this example embodiment is mounted in a hybrid vehicle that runs using both an engine and an electric motor, or in an electric vehicle that runs using an electric motor, or the like.

As shown in FIG. 1, this vehicle power control apparatus 1 includes a secondary battery 3, a charging plug (charging terminal) 5, a power outlet (discharging terminal) 7, a charger 9, a power supplier 11, a notifying portion 15, and a control unit 13 and the like.

In this vehicle power control apparatus 1, it is possible to control both the supplying of power from the secondary battery 3 to an alternating-current load (hereinafter, simply referred to as "AC load") 17 outside the vehicle, and the charging of power from an alternating-current power supply (hereinafter, simply referred to as "AC power supply") 19 to the secondary battery 3. Furthermore, as will be described later, if the charging plug 5 is mistakenly plugged into (i.e., connected to) the power outlet 7, the charger 9 will stop such that charging from the charging plug 5 stops, and the vehicle user or the like is able to be notified of the improper connection (or improper plug-in).

The secondary battery 3 is a direct-current (DC) power supply that can be charged and discharged and is mounted in a vehicle. The secondary battery 3 stores power to be supplied to an electric motor used as a power source of the hybrid vehicle or the electric vehicle or the like.

The charging plug 5 is a terminal that is detachably connected to a power receptacle (supply terminal) 19a of the AC power supply 19 outside the vehicle, and receives AC power from this AC power supply 19. The charging plug 5 is structured as a terminal that is able to be plugged, in a manner that enables it to also be unplugged, a power receptacle of a typical household, for example. The AC power supply is a commercial power supply of AC 100 V, for example.

The power outlet 7 is a terminal into which a power plug (receiving terminal) 17a of the AC load 17 outside the vehicle is plugged in a manner that enables it to also be unplugged, and that supplies AC power created from the DC power stored in the secondary battery 3 to the AC load 17. The power outlet 7 is structured as a plug having the same shape as a power receptacle of a typical household. The power plug 17a is a terminal with which the AC load 17 inputs power from the outside (i.e., from an external power supply), and is the same shape as the charging plug 5 described above. The AC load is a load that operates by AC power, such as a household electrical appliance.

The charger 9 charges power input from the charging plug 5 to the secondary battery 3, and includes an inverter 9a, a voltage converting portion 9b, and a voltage detecting portion 9c and the like, for example.

The inverter 9a converts AC power input from the charging plug 5 to DC power. This operation will be referred to as "operation A". This inverter 9a is configured as a well-known inverter that is formed by a bridge circuit that includes a switching element, for example, and converts DC power into AC power by an ON/OFF operation of the switching element.

The voltage converting portion 9b converts the voltage of the DC power output from the inverter 9a to a voltage appropriate for charging the secondary battery 3, and outputs this DC power to the secondary battery 3. This operation will be referred to as "operation B". For example, the voltage converting portion 9b is formed by a well-known DC/DC converter.

The voltage detecting portion 9c detects the voltage input from the charging plug 5. Here, the voltage detecting portion 9c is connected between the charging plug 5 and the inverter 9a, and detects the voltage input from the charging plug 5 by detecting the output voltage of the charging plug 5.

The power supplier 11 supplies the power stored in the secondary battery 3 to the AC load 17 that is outside the vehicle and connected to the power outlet 7. For example, the power supplier 11 includes a voltage converting portion 11a, an inverter 11b, and a current detecting portion 11c and the like.

The voltage converting portion 11a converts the voltage of the DC power discharged from the secondary battery 3 to a predetermined voltage. This operation will be referred to as "operation C". For example, the voltage converting portion 11a is formed by a well-known DC/DC converter. The predetermined voltage is a DC voltage corresponding to AC 100 V, for example.

The inverter 11b converts the DC power output from the voltage converting portion 11a to AC power of a predetermined frequency, and outputs this AC power from the power outlet 7. This operation will be referred to as "operation D". The inverter 11b is configured as a well-known inverter that is formed by a bridge circuit that includes a switching element, and converts DC power to AC power by an ON/OFF operation of this switching element. The predetermined frequency is a commercial power supply frequency, for example.

Also, the voltage converting portion 11a fluctuates the voltage of the DC power discharged from the secondary battery 3 at predetermined intervals of time and outputs this voltage to the inverter 11b, in addition to performing operation C, according to control by the control unit 13. This operation will be referred to as "operation E".

Figure 3:
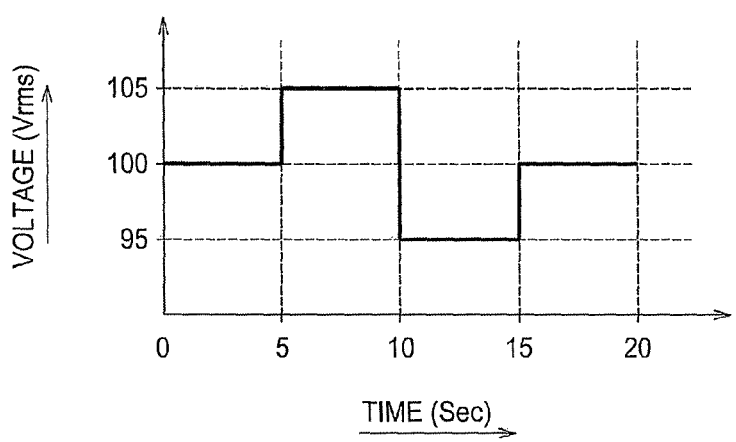
FIG. 3 is, a graph showing an example of a voltage fluctuation pattern of alternating-current power output from a power outlet (a discharging terminal) in the example embodiment shown in FIG. 1.

More specifically, FIG. 3 shows one example of this voltage fluctuation. At a, first predetermined time, the voltage converting portion 11a converts the voltage of the DC power discharged from the secondary battery 3 to 100 V, for example, and converts the DC power output from this voltage converting portion 11a to AC power of a predetermined frequency to obtain 100 Vrms (AC). At the next (second) predetermined time, a similar operation is performed to obtain 105 Vrms (AC), and then at the next (third) predetermined time, a similar operation is performed to obtain 95 Vrms (AC). Then from the next (fourth) predetermined time, a pattern repeating this order may be set. These predetermined times are each set to 5 seconds, for example. The predetermined frequency is set to a commercial power supply frequency, for example.

In this way, during an improper connection detection period, the voltage value of power supplied from outside the vehicle is able to be fluctuated within a usable range of the AC load 17. Therefore, when the power plug 17a of the AC load 17 that is a proper connecting counterpart is plugged into the power outlet 7, for example, the AC load 17 is able to operate even during the improper connection detection period. The usable range is 95 to 105 Vrms, inclusive.

The current detecting portion 11c detects whether current is flowing to the power outlet 7. Here, the current detecting portion 11c is connected between the power outlet 7 and the inverter 11b. The current detecting portion 11c detects whether current is flowing to the power outlet 7 by detecting current flowing from the inverter 11b to the power outlet 7.

The notifying portion 15 notifies the user of the vehicle or the like by an warning display or a warning sound when it is determined by an improper plug-in determining portion 13d, to be described later, that there is an improper connection. An improper connection occurs when the charging plug 5 that is not a proper connecting counterpart is mistakenly plugged into the power outlet 7.

This notifying portion 15 includes a display portion 15a such as an indicator for displaying a warning, and an audio output portion 15b such as a speaker for outputting a warning sound. In this example embodiment, the notifying portion 15 includes the display portion 15a and the audio output portion 15b, but it may also include only one of these.

The control unit 13 controls the charger 9, the power supplier 11, and the notifying portion 15, and includes function realizing means such as a control portion 13a, an outlet plug-in detecting portion 13b, a voltage fluctuation detecting portion 13c, and an improper plug-in determining portion 13d and the like.

The outlet plug-in detecting portion 13b detects whether the power plug 17a of the AC load 17 or the charging plug 5 is plugged into the power outlet 7, based on the detection result of the current detecting portion 11c.

Here, when it is detected by the current detecting portion 11c that current is flowing to the power outlet 7, the outlet plug-in detecting portion 13b detects that the power plug 17a of the AC load 17 or the charging plug 5 is plugged into the power outlet 7. On the other hand, when it is detected by the current detecting portion 11c that current is not flowing to the power outlet 7, the outlet plug-in detecting portion 13b detects that the power plug 17a of the AC load 17 or the charging plug 5 is not plugged into the power outlet 7.

Here, when the power plug 17a of the AC load 17 or the charging plug 5 is plugged into the power outlet 7, for example, current flows to the power outlet 7, and this current is detected by the current detecting portion 11c. The current is instantaneous current, for example. Then, the outlet plug-in detecting portion 13b detects whether the power plug 17a of the AC load 17 or the charging plug 5 is plugged into the power outlet 7, based on this detection result.

The voltage fluctuation detecting portion 13c detects whether there is a voltage fluctuation of the AC power input from the charging plug 5, for example, based on the detection result of the voltage detecting portion 9c.

The improper plug-in determining portion 13*d* determines whether the charging plug 5 that is not a proper connecting counterpart is plugged into the power outlet 7, based on the detection result of the voltage fluctuation detecting portion 13*c*. This determination is made after a process to fluctuate the voltage from the power outlet 7 (i.e., a voltage fluctuating process) (operation E), which will be described later, is executed.

Here, the improper plug-in determining portion 13*d* first detects whether the voltage of the AC power input from the charging plug 5 is fluctuating, based on the detection result of the voltage fluctuation detecting portion 13*c*. That is, the improper plug-in determining portion 13*d* compares voltage fluctuation detected by the voltage fluctuation detecting portion 13*c* with voltage fluctuation of the AC power output from the power outlet 7. If the result of this comparison is that the fluctuations are the same, the improper plug-in determining portion 13*d* detects that the voltage of the AC power input from the charging plug 5 is fluctuating. On the other hand, if the result of the comparison is that the fluctuations are not the same, the improper plug-in determining portion 13*d* detects that the voltage of the AC power input from the charging plug 5 is not fluctuating.

Also, if it is detected that the fluctuations are the same, the improper plug-in determining portion 13*d* determines that the charging plug 5 that is not a proper connecting counterpart is plugged into the power outlet 7. That is, it is determined that the connection is an improper connection. On the other hand, if it is detected that the fluctuations are not the same, the improper plug-in determining portion 13*d* determines that the power plug 17*a* of the AC load 17 that is a proper connecting counterpart is plugged into the power outlet 7. That is, it is determined that the connection is not an improper connection.

The control portion 13*a* then performs a control a1 together with a control b1. The control a1 is control that controls the power supplier 11 based on the detection result of the outlet plug-in detecting portion 13*b* and the determination result of the improper plug-in determining portion 13*d*. Also, the control b1 is control that controls the charger 9 and the notifying portion 15 based on the determination result of the improper plug-in determining portion 13*d*.

More specifically, in the control a1, the control portion 13*a* performs the operation described below until the process to fluctuate the voltage from the power outlet 7 (operation E), which will be described later, is executed, for example. When the power plug 17*a* of the AC load 17 or the charging plug 5 is plugged into the power outlet 7, the control portion 13*a* operates the voltage converting portion 11*a* such that operation C described above is performed, and operates the inverter 11*b* such that operation D described above is performed, so that current flows to the power outlet 7.

If the current detecting portion 11*c* detects current flowing to the power outlet 7 from this plug-in connection, the outlet plug-in detecting portion 13*b* detects that the power plug 17*a* of the AC load 17 or the charging plug 5 is plugged into the power outlet 7.

Also, in the control a1 described above, the control portion 13*a* performs the operation described below when it is detected by the outlet plug-in detecting portion 13*b* that the power plug 17*a* of the AC load 17 or the charging plug 5 is plugged into the power outlet 7. The control portion 13*a* operates the voltage converting portion 11*a* such that operation E described above is performed, and operates the inverter 11*b* such that operation D described above is performed, to fluctuate the voltage of the AC power output from the power outlet 7.

Also, in the control a1 described above, the control portion 13*a* performs the operation described below when it is determined by the improper plug-in determining portion 13*d* that the connection is not an improper connection. The control portion 13*a* operates the voltage converting portion 11*a* such that operation C described above is performed, and operates the inverter 11*b* such that operation D described above is performed, to make the voltage of the AC power output from the power outlet 7 constant. A case in which the connection is not an improper connection is a case in which the power plug 17*a* of the AC load 17 that is a proper connecting counterpart is plugged into the power outlet 7. On the other hand, the control portion 13*a* performs the operation described below when it is determined by the improper plug-in determining portion 13*d* that the connection is an improper connection. The control portion 13*a* stops the voltage converting portion 11*a* and the inverter 11*b* such that AC power is not output from the power outlet 7.

Also, in the control b1, if it is determined by the improper plug-in determining portion 13*d* that the connection is an improper connection, the control portion 13*a* stops the inverter 9*a* and the voltage converting portion 9*b*, and directs the notifying portion 15 to perform a notifying operation. Stopping the inverter 9*a* and the voltage converting portion 9*b* consequently stops charging with the charger 9.

By this notifying operation, a warning display indicating that there is an improper connection, for example, is displayed on the display portion 15*a*, and a warning sound, for example, is output from the audio output portion 15*b*. The warning display may be a symbol or a message, for example. As a result, the vehicle user is able to recognize the improper connection.

Also, in the control b1, when it is determined by the improper plug-in determining portion 13*d* that the connection is not an improper connection, the control portion 13*a* operates the voltage converting portion 11*a* such that operation C described above is performed, and operates the inverter 11*b* such that operation D described above is performed, to supply AC power of a constant voltage to the AC load 17 from the power outlet 7 via the power plug 17*a*.

Figure 2:
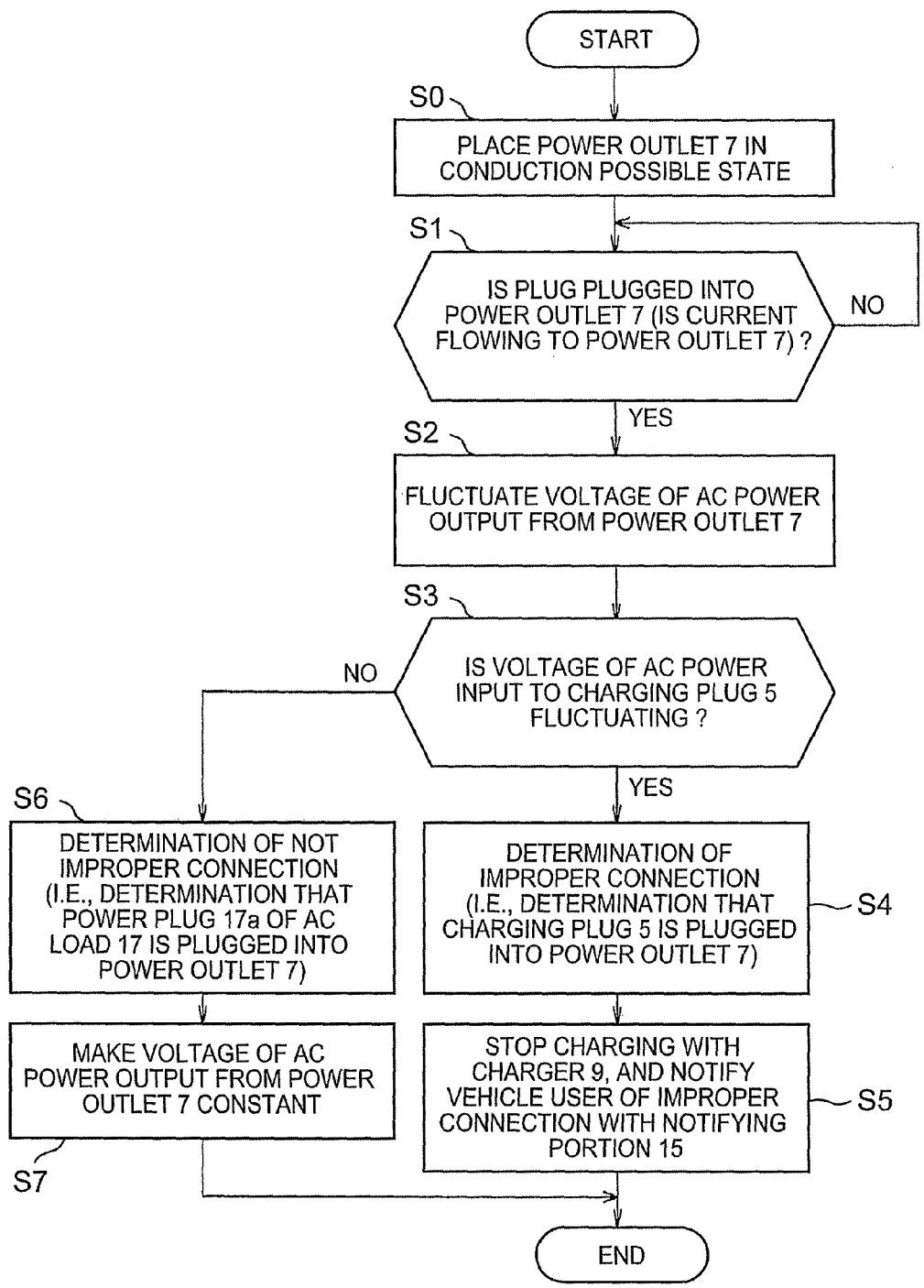
FIG. 2 is a flowchart illustrating operation of the vehicle power control apparatus according to the example embodiment shown in FIG. 1.

The operation of the vehicle power control apparatus 1 will now be described in detail with reference to the flowchart shown in FIG. 2.

In step S0, the control portion 13*a* controls the voltage converting portion 11*a* and the inverter 11*b* such that the power outlet 7 is placed in a conduction possible state. The conduction possible state is a state in which current will flow to the power outlet 7 when the power plug 17*a* of the AC load 17 or the charging plug 5 is plugged into the power outlet 7.

More specifically, in step S0, the voltage converting portion 11*a* converts the voltage of DC power from the secondary battery 3 to a predetermined voltage and outputs this DC power to the inverter 11*b* (i.e., operation C described above), and the inverter 11*b* converts the DC power output from the voltage converting portion 11*a* to AC power (i.e., operation D described above). The predetermined voltage is DC voltage that corresponds to AC 100 V, for example, and the AC power is commercial system power, for example.

Then in the next step, step S1, the outlet plug-in detecting portion 13*b* detects whether the power plug 17*a* of the AC load 17 or the charging plug 5 is plugged into the power outlet 7.

Here, the outlet plug-in detecting portion 13*b* makes this detection based on the detection result of the current detecting portion 11*c*. That is, if the current detecting portion 11*c* detects that current is flowing to the power outlet 7, the outlet plug-in detecting portion 13*b* detects that the power plug 17*a* of the AC load 17 or the charging plug 5 is plugged into the power outlet 7. On the other hand, if the current detecting portion 11c detects that current is not flowing to the power outlet 7, the outlet plug-in detecting portion 13b detects that the power plug 17a of the AC load 17 or the charging plug 5 is not plugged into the power outlet 7.

Also, if as a result of the detection in step S1 it is determined by the outlet plug-in detecting portion 13b that the power plug 17a of the AC load 17 or the charging plug 5 is not plugged into the power outlet 7, the process returns to step S1.

On the other hand, if as a result of the detection in step S1 it is determined by the outlet plug-in detecting portion 13b that the power plug 17a of the AC load 17 or the charging plug 5 is plugged into the power outlet 7, the process proceeds on to step S2.

In step S2, the control portion 13a controls the voltage converting portion 11a and the inverter 11b (i.e., operation E and operation D) to fluctuate the voltage of the AC power output from the power outlet 7 in a manner such as that shown in FIG. 3.

Then in the next step, step S3, the improper plug-in determining portion 13d detects whether the voltage of the AC power input to the charging plug 5 is fluctuating.

Here, the improper plug-in determining portion 13d makes this detection based on the detection result of the voltage fluctuation detecting portion 13c. That is, if the voltage fluctuation detecting portion 13c detects the voltage fluctuation, the improper plug-in determining portion 13d detects that the voltage of the AC power input to the charging plug 5 is fluctuating in the same manner that the voltage of the AC power output from the power outlet 7 is fluctuating. On the other hand, if the voltage fluctuation detecting portion 13c does not detect the voltage fluctuation, the improper plug-in determining portion 13d detects that the voltage of the AC power input to the charging plug 5 is not fluctuating in the same manner that the voltage of the AC power output from the power outlet 7 is fluctuating.

Then, if as a result of the detection in step S3 it is determined by the improper plug-in determining portion 13d that the voltage of the AC power input to the charging plug 5 is fluctuating in the same manner that the voltage of the AC power output from the power outlet 7 is fluctuating, the process proceeds on to step S4 described below.

In step S4, the improper plug-in determining portion 13d determines that there is an improper connection, and the process proceeds on to step S5.

In step S5, the control portion 13a stops the inverter 9a and the voltage converting portion 9b, and directs the notifying portion 15 to perform a notifying operation indicating that there is an improper connection. Stopping the inverter 9a and the voltage converting portion 9b consequently stops charging from the charging plug 5 with the charger 9. Then this cycle of the routine in the flowchart ends.

As shown in step S5, by stopping charging from the charging plug 5 with the charger 9, even if the charging plug 5 that is not a proper connecting counterpart is mistakenly plugged into the power outlet 7, a cycle in which power stored in the secondary battery 3 is charged to the secondary battery 3 via the power supplier 11, the power outlet 7, the charging plug 5, and the charger 9 in this order is prevented. Therefore, power loss that occurs at the power supplier 11 and the charger 9 with this cycle is able to be eliminated, so the power stored in the secondary battery 3 is prevented from being consumed.

Also, in step S5, the control portion 13a may also stop the voltage converting portion 11a and the inverter 11b. That is, the control unit 13 may also stop power from being supplied from the power outlet 7 by the power supplier 11.

If as a result of the detection in step S3 it is detected by the improper plug-in determining portion 13d that the voltage of the AC power input to the charging plug 5 is fluctuating in the same pattern as the fluctuation pattern of the voltage of the AC power output from the power outlet 7, the process proceeds on to step S6.

In step S6, the improper plug-in determining portion 13d determines that the connection is not an improper connection, and the process proceeds on to step S7.

In step S7, the control portion 13a controls the voltage converting portion 11a to make the voltage of the AC power output from the power outlet 7 constant. As a result, the proper AC power is supplied to the power plug 17a of the AC load 17 that is a proper connection counterpart that is plugged into the power outlet 7. Then this cycle of the routine in the flowchart ends.

More specifically, in step S7, the control portion 13a controls the voltage converting portion 11a to convert the voltage of the DC power from the secondary battery 3 to a predetermined voltage (such as DC voltage corresponding to AC 100 V, for example), and output this DC power to the inverter 11b (i.e., operation C described above), and controls the inverter 11b to convert the DC power output from the voltage converting portion 11a to AC power (such as commercial system power, for example) (i.e., operation D described above).

As described above, with the vehicle power control apparatus 1 to which the invention is applied, the following is able to be realized when the charging plug 5 that is not a proper connection counterpart is mistakenly plugged into the power outlet 7. The vehicle user or the like is able to be quickly notified of the improper connection by having the notifying portion 15 perform the notifying operation. Also, charging from the charging plug 5 by the charger 9 is able to be stopped.

As a result, when there is an improper connection, the vehicle user or the like is able to quickly be made aware of the fact, so the vehicle user is able to respond to quickly correct the improper connection. This response makes it possible to quickly stop power of the secondary battery 3 from being consumed due to the improper connection.

Moreover, when it is detected that the power plug 17a of the AC load 17 or the charging plug 5 is connected to the power outlet 7, AC power output from the power outlet 7 is able to be supplied to the connecting counterpart of the power outlet 7 during the period from the time of the detection until a determination is made as to whether the charging plug 5 that is not a proper connecting counterpart is plugged into the power outlet 7. The connecting counterpart is the AC load 17 or the charging plug 5.

As a result, if the power plug 17a of the AC load 17 that is a proper connecting counterpart is plugged into the power outlet 7, AC power output from the power outlet 7 would be supplied even though the voltage is fluctuating, from the time at which the connection is detected. Therefore, usability is improved, e.g., the AC load 17 is able to be operated.

Also, when detecting the improper connection, the voltage of the AC power output from the power outlet 7 is merely fluctuated using the existing power supplier 11, so it is extremely practical, e.g., the circuit configuration of the power supplier 11 does not need to be drastically changed.

In this example embodiment, conduction in the power outlet 7 is detected as a method for detecting that the power plug 17a of the AC load 17 that is a proper connecting counterpart or the charging plug 5 that is not a proper connecting counterpart is connected to the power outlet 7, but the invention is not limited to only this.

More specifically, as this method, it is also possible to provide a voltage detecting portion instead of the current detecting portion 11c, and detect whether there is a change in voltage of the power outlet 7 when the power plug 17a or the charging plug 5 is plugged into the power outlet 7, using this voltage detecting portion. Also, as this method, it is possible to provide the power outlet 7 with a detection switch that turns on and off according to whether the power plug 17a or the charging plug 5 is plugged into the power outlet 7, and detect an ON/OFF signal output from this detection switch.

While example embodiments of the invention have been described with reference to the accompanying drawings, it goes without saying that the invention is not limited to these examples. It should be understood that various modifications or improvements within the scope of the claims for patent are conceivable to one skilled in the art, and that these are of course also included in the technical scope of the invention.

For example, in the example embodiment described above, the outlet plug-in detecting portion 13b that detects whether the power plug 17a of the AC load 17 or the charging plug 5 is plugged into the power outlet 7 is provided, but the invention is not limited to this.

For example, although not shown, a charging plug plug-in detecting portion that detects whether the charging plug 5 is plugged into the power receptacle 19a of the AC power supply 19 that is a proper connecting counterpart or the power outlet 7 that is not a proper connecting counterpart may be provided instead of the outlet plug-in detecting portion 13b of the example embodiment described above.

As the method by which the charging plug plug-in detecting portion detects that the charging plug 5 is plugged into the power receptacle 19a or the power outlet 7, the charging plug plug-in detecting portion may detect conduction in the charging plug 5. Aside from this, whether there is a change in the voltage of the charging plug 5 produced when the charging plug 5 is plugged in may be detected using the voltage detecting portion 9c. Also, the charging plug 5 may be provided with a detection switch that turns on and off according to whether the charging plug 5 is plugged in, and an ON/OFF signal output from this detection switch may be detected.

In this case, when it is detected by the charging plug plug-in detecting portion that the charging plug 5 is plugged into the power receptacle 19a of the AC power supply 19 that is a proper connecting counterpart or the power outlet 7 that is not a proper connecting counterpart, a process to fluctuate the voltage of the AC power output from the power outlet 7 (i.e., operation E described above) is performed.

Also, in this example embodiment, when an improper connection is detected, the notifying operation regarding the improper connection is performed, and the charging operation is stopped. Aside from this, a case in which only the notifying operation regarding the improper connection is performed when the improper connection is detected may also be included as an example embodiment of the invention.

The invention may preferably be used in a vehicle power control apparatus provided with a charging terminal for charging power from an AC power supply outside of a vehicle to a secondary battery, and a discharging terminal for supplying power to an AC load outside of the vehicle.

Also, the vehicle power control apparatus of the invention may be applied to a vehicle, such as a hybrid vehicle that uses both an engine and an electric motor in combination as a power source or an electric vehicle that uses only an electric motor as a power source for example, which is provided with a secondary battery for charging power to be supplied to the electric motor.

What is claimed is:

1. A vehicle power control apparatus comprising:
a secondary battery;
a charging terminal that is able to be connected to a supply terminal of a predetermined alternating-current power supply;
a charger configured to convert alternating-current power input from the charging terminal to direct-current power and charge the direct-current power to the secondary battery;
a discharging terminal that is able to be connected to a receiving terminal of a predetermined alternating-current load and the charging terminal;
a power supplier configured to convert the direct-current power from the secondary battery to alternating-current power and output the alternating-current power from the discharging terminal;
a notifying portion configured to perform a notifying operation indicating that the charging terminal is improperly connected to the discharging terminal; and
a control unit configured to control the charger, the power supplier, and the notifying portion,
wherein the control unit is configured to fluctuate a voltage of the alternating-current power output from the discharging terminal with the power supplier when the control unit detects that the receiving terminal of the alternating-current load or the charging terminal is connected to the discharging terminal, or that the supply terminal of the alternating-current power supply or the discharging terminal is connected to the charging terminal, and the control unit is configured to direct the notifying portion to perform the notifying operation when the control unit detects that the voltage of alternating-current power input to the charging terminal is fluctuating in the same manner that the voltage of the alternating-current power output from the discharging terminal is fluctuating.

2. A control method of power for a vehicle, the vehicle including a secondary battery, a charging terminal that is able to be connected to a supply terminal of a predetermined alternating-current power supply, a charger configured to convert alternating-current power input from the charging terminal to direct-connect power and charge the direct-current power to the secondary battery, a discharging terminal that is able to be connected to a receiving terminal of a predetermined alternating-current load and the charging terminal, and a power supplier configured to convert the direct-current power from the secondary battery to alternating-current power and output the alternating-current power from the discharging terminal,
the control method comprising:
detecting that the receiving terminal of the alternating-current load or the charging terminal is connected to the discharging terminal, or that the supply terminal of the alternating-current power supply or the discharging terminal is connected to the charging terminal;
fluctuating a voltage of the alternating-current power output from the discharging terminal;
detecting that the voltage of alternating-current power input to the charging terminal is fluctuating in the same manner that the voltage of the alternating-current power output from the discharging terminal is fluctuating; and
performing a notifying operation indicating that the charging terminal is improperly connected to the discharging terminal.

* * * * *

UNITED STATES PATENT AND TRADEMARK OFFICE
CERTIFICATE OF CORRECTION

| | |
|---|---|
| PATENT NO. | : 9,136,720 B2 |
| APPLICATION NO. | : 13/921605 |
| DATED | : September 15, 2015 |
| INVENTOR(S) | : Naruse |

It is certified that error appears in the above-identified patent and that said Letters Patent is hereby corrected as shown below:

In the specification

In column 12, line 42, change "to direct-connect power" to -- to direct-current power --.

Signed and Sealed this
Fourteenth Day of June, 2016

Michelle K. Lee
*Director of the United States Patent and Trademark Office*